United States Patent Office 3,082,893
Patented Mar. 26, 1963

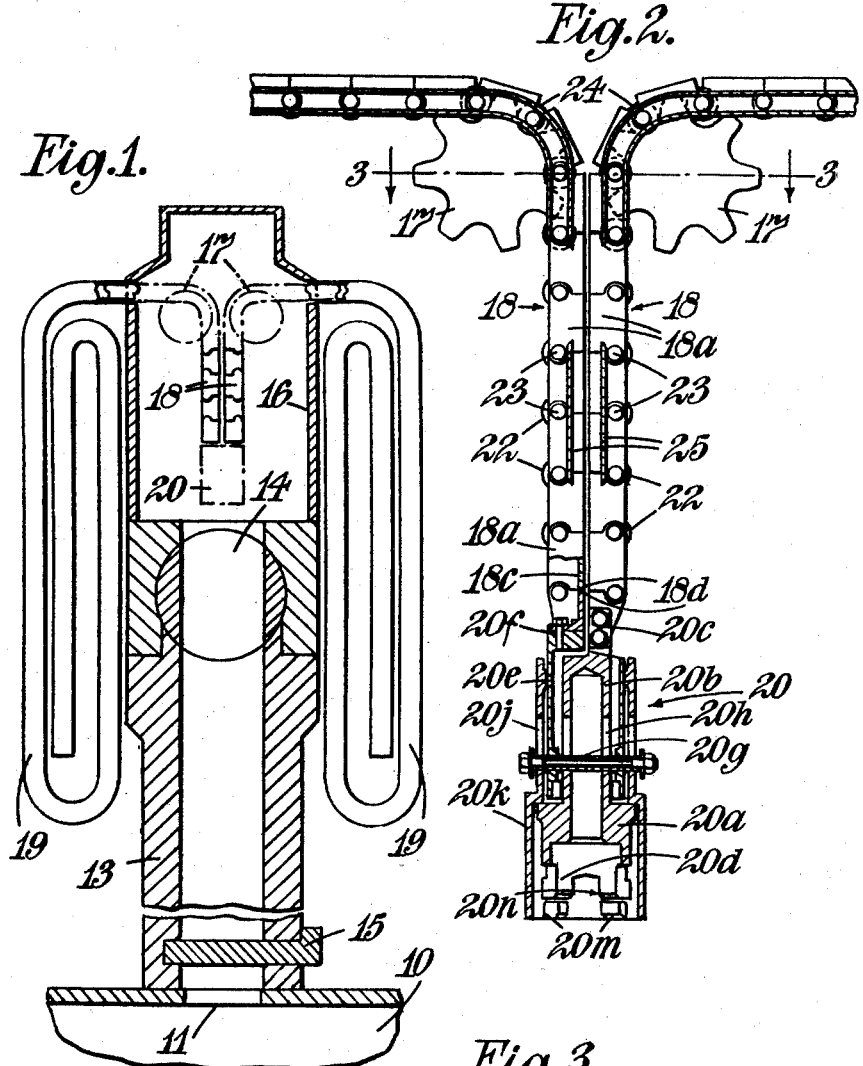

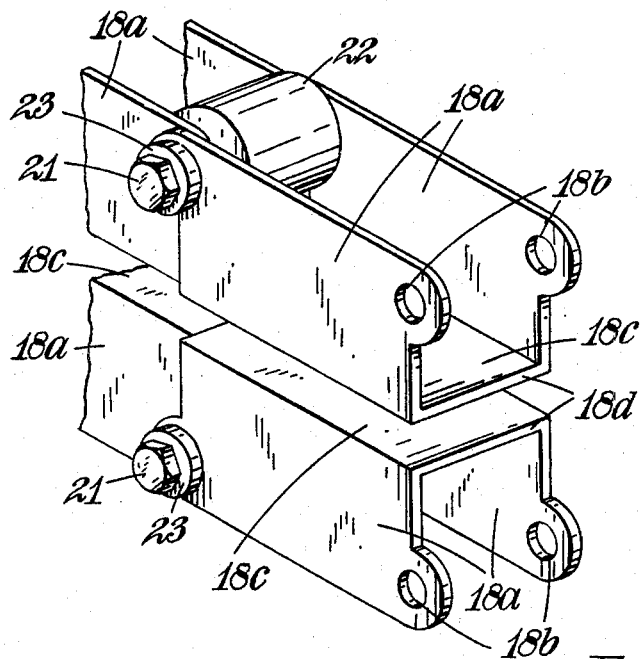
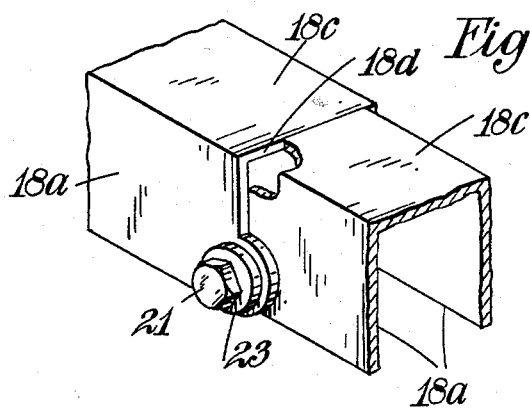
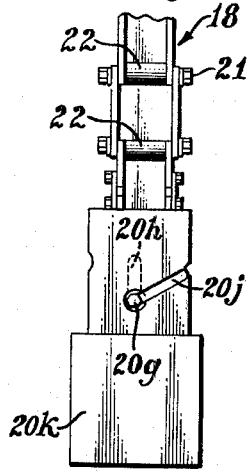

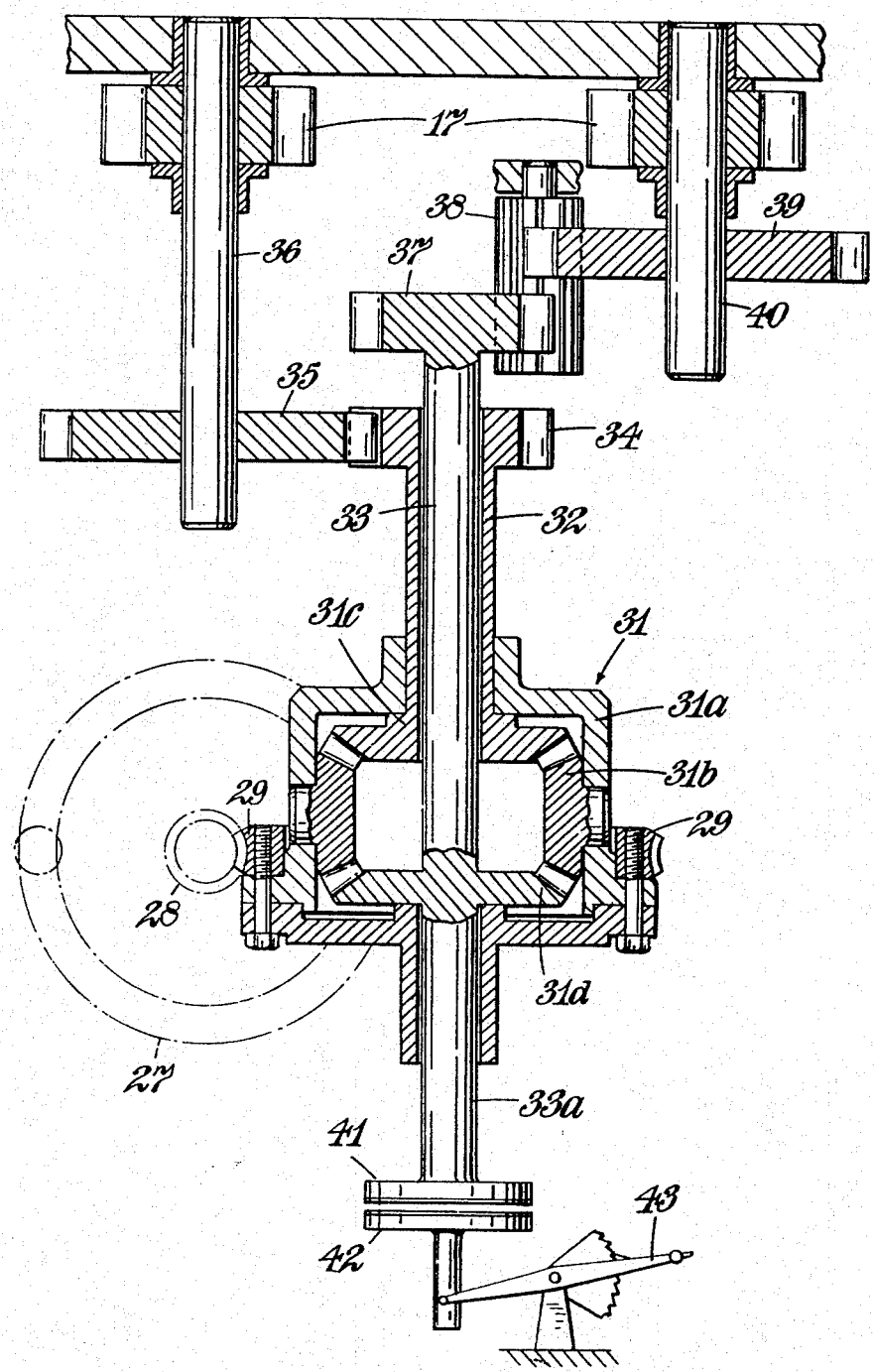

3,082,893
HANDLING APPARATUS
John Shaw Hollings, Willington, Derby, and Ernest Raymond Unitt, Derby, England, assignors to Rolls-Royce & Associates Limited, Derby, England
Filed Jan. 6, 1960, Ser. No. 856
Claims priority, application Great Britain Feb. 27, 1959
10 Claims. (Cl. 214—658)

This invention comprises improvements in or relating to handling apparatus.

According to the invention, handling apparatus comprises a probe structure for carrying a pick-up device which is to be moved in a rectilinear path, the probe structure being constituted essentially by a pair of chains each of which has links with abutments offset to one side of pivot pins joining the links thereby to prevent bending of the chain from the straight in one sense, the pick-up device being mounted on adjacent ends of the chains, and a drive for the chains whereby they are fed side by side into said path so that each chain opposes bending of the other chain from the straight in the opposite sense.

In one preferred form, the chains have channel section links, the pivot pin holes being adjacent the free edges of the side flanges of the channel and the end surfaces of the base web of the channel forming the abutments and being contained in planes which are at right angles to the plane of the pivot pin axes and contain in the respective axes, whereby the end surfaces are pressed firmly into contact when the chain is straight.

According to a preferred feature of this invention, the drive for the chains is arranged so that they can be fed from or into separate housings either to equal extents, or to unequal extents. In one arrangement the unequal feed of the chains is employed to effect an article engaging or disengaging adjustment of the pick-up device.

According to one preferred construction employing channel-section link chains as above set forth, the drive comprises a pair of chain sprockets, one on each side of the path, guides for the chains leading from storage housings for the chains, the guides following the periphery of the sprockets to lead the chains into the rectilinear path, and gearing interconnecting the sprockets including a differential having its sun gears driving respective sprockets, a drive input to its planet carrier, and a brake acting on one of the sun gears. There may be straight chain guides arranged parallel to the path and adapted to assist in preventing deflection of the probe structure from the path. The pivot pins of the chains preferably carry rollers within the channel links to engage the sprockets and further rollers externally of the channel links to engage the guides.

One construction of handling apparatus of this invention will now be described with reference to the accompanying drawings in which:

FIGURE 1 is a diagrammatic illustration of the handling device in use,

FIGURE 2 shows in more detail the probe structure of the handling device, parts being in section, FIGURE 2a shows the pick-up device in outside elevation, FIGURE 3 is a section on the line 3—3 of FIGURE 2, FIGURES 4 and 5 are detail views of parts of the probe structure, and FIGURE 6 shows diagrammatically a drive construction for the handling device.

In FIGURE 1, the handling apparatus is shown in position for moving an article from a chamber 10 through an aperture 11 formed in the wall of the chamber into a tubular coffin 13 which has a rotary closure valve 14 at its upper end and a slide closure valve 15 at its lower end. In use, the valves 14, 15 are opened and the article is drawn by the handling apparatus from the chamber 10 into the coffin 13, the valve 15 is then closed, the article is released from the handling apparatus and the valve 14 is then closed. Thereafter the coffin 13 with the article inside is removed. An article may be fed into the chamber from a coffin by an appropriate series of operations.

The handling apparatus comprises a main housing 16 within which are mounted a pair of sprockets 17 by means of which a pair of chains 18 forming a probe may be fed from separate chain housings 19 into a rectilinear path extending through the coffin 13 and aperture 11, and by means of which the chains may be fed from the path into their respective housings 19. The probe carries a pick-up device 20 which is mounted on adjacent ends of the chains 18 and which can be drawn up into the main housing 16 clear of the coffin 13. The chain housings 19 are disposed one on each side of the rectilinear path of the probe and are of flat coil form so that a substantial length of chain can be stored compactly.

Each of the chains 18 is of the kind which is prevented from bending from the straight in one sense, and comprises (FIGURES 2 to 5) channel section links, each link having (FIGURES 3 to 5) side flanges 18a with pivot pin receiving holes 18b in them adjacent their free edges and close to the ends of the links, and also having base webs 18c joining the side flanges 18a. The end surfaces 18d of the base web 18c of each link are contained in planes which contain the common axis of the adjacent pair of holes 18b and are at right angles to the plane containing the pair of axes of the link. The end surfaces 18d form abutments for the links limiting relative rotation of them in one direction and thus preventing bending of the chain beyond the straight. The chains are however free to bend in a sense to separate the abutment surfaces 18d.

The links are joined by pivot pins 21 (FIGURES 3, 4 and 5) carrying rollers 22 within the channel-section links and rollers 23 externally of the links. The rollers 22 engage the sprockets 17 and the rollers 23 run in channel-section guides 24, 25 (FIGURES 2 and 3). The guides 24 lead the chains 18 from their housings 19 and guide them around the peripheries of the sprockets 17 into the rectilinear path to be followed by the pick-up device 20, and since the chains can bend in the sense to separate the abutment surfaces 18d, they will have the base webs 18c of their links adjacent one another when in the rectilinear path so that each chain opposes the otherwise possible bending of the other chain. Guides 25 are parallel to the rectilinear path of the pick-up device 20 and improve the rigidity of the probe structure.

The pick-up device shown in FIGURE 2 comprises a main body 20a having a stem 20b by which the body is secured at 20c to the end of one chain 18 and also having at its lower end angularly-spaced axially-extending dogs 20d. The stem 20b is surrounded by a sleeve 20e secured at 20f to the other chain 18 and the sleeve carries a cross pin 30g extending through straight longitudinally-extending slots 20h in the stem 20b and in helical slots 20j in a second sleeve 20k surrounding the main body 20a and sleeve 20e. The sleeve 20k has internal angularly-spaced dogs 20m, which, with the parts in the positions shown, are axially-aligned with the dogs 20d, but which can be aligned with the spaces 20n between the dogs 20d by raising the sleeve 20e relative to the body 20a thus rotating the sleeve 20k relative to the body 20a by means of the pin 20g and slots 20h, 20j. The article to be handled will in this case have dogs to enter the spaces 20n to be trapped therein by the dogs 20m.

Actuation of the pick-up device is effected by lengthwise relative movement of the chains 18 and therefore the drive for the chains must not only be capable of feeding the chains together to equal extents, but must also be capable of feeding them to unequal extents. One suitable form of drive is shown in FIGURE 6.

The power input element of the drive is a hand wheel 27 which drives a worm 28 meshing with a worm wheel 29 secured to the planet cage 31a of a differential gear 31. Planet gears 31b carried by the cage 31a mesh with a pair of sun gears 31c, 31d secured on coaxial shafts 32, 33 respectively.

The shaft 32 has secured on it a gear 34 meshing with a further gear 35 which is secured to a shaft 36 carrying one of the sprockets 17.

The shaft 33 has secured on it a gear 37 meshing with an idler gear 38 which in turn meshes with a gear 39 carried on a shaft 40 for the other sprocket 17. The shaft 33 also has an extension 33a carrying a brake disc 41 which may be engaged by a non-rotating brake disc 42 under control of lever 43.

When the brake discs 41, 42 are out of contact, rotation of the hand wheel 27 causes equal and opposite rotation of the sprockets 17, but when the brake is applied shaft 33 is stopped and the left hand sprocket 17 only is driven.

The drive is preferably accommodated in the main housing 16 and the handling apparatus may be mounted on rails or the like to enable it to be brought into position in line with the coffin 13.

The handling apparatus just described is suitable for use with nuclear reactors, for example, for handling fuel elements, and in this case the chamber 10 may house the reactor core and reflector mass, and the aperture 11 may be in an adjustable member to enable the aperture to be aligned with fuel element bores or tubes in the reactor.

We claim:
1. Handling apparatus comprising
   (a) a proble structure, said probe structure comprising
      ($a_1$) a pair of chains, each of said chains consisting of
      ($a_2$) a plurality of channel-section links pivoted together end to end, each channel-section link having
      ($a_3$) a base web, which has longitudinally spaced end surfaces, and
      ($a_4$) a pair of side flanges extending longitudinally of the chain along the base web,
      ($a_5$) said side flanges having pivot pin holes in them adjacent each end,
      ($a_6$) pivot pins engaging the holes and interconnecting the links end to end,
      ($a_7$) each end surface of the base web of each link being contained in a plane which also contains the axis of the pivot pin engaging the pivot pin holes in the adjacent ends of the side flanges and which is at right angles to a plane containing the axes of the pivot pins connecting the link to the next adjacent links, and said end surfaces being offset from the pivot pins, straightening of the chain causing relative rotation of the links in a sense to bring the adjacent end surfaces of the base webs into firm abutment to prevent further relative rotation of the links in said sense beyond a position in which the base webs are aligned, said abutting end surfaces being separated by relative rotation of the links in the opposite sense,
   (b) a drive feeding said chains side by side into a straight line path with the base webs of each chain aligned and with the channels of the links of one chain facing transversely of this path oppositely to the channels of the other chain, the portions of each chain in the path restraining each other against deflection from the path, and
   (c) means pivoted to adjacent ends of the chains and movable along said path by feeding the chains into and out from said path, said means engaging an article to be handled by the apparatus.

2. Handling apparatus according to claim 1, said drive feeding said chains selectively to equal extents or to unequal extents into said path.

3. Handling apparatus according to claim 2, said means pivoted to the ends of the chains comprising a first member pivoted to one of said chains and a second member pivoted to the other of said chains and movable relative to the first member, unequal feeding of said chains into said path effecting relative movement of said members.

4. Handling apparatus according to claim 1, comprising a pair of storage housings, one for each chain, said housings being one on each side of said path, the drive comprising a pair of chain sprockets, one for each chain and one on each side of the path, guides for the chains leading from the storage housings for the chains, the guides following the periphery of the sprockets to lead the chains into the straight path, and gearing interconnecting the sprockets and including a differential gear, the differential gear having sun gears driving the sprockets respectively, a planet carrier, planet gears mounted in the planet carrier and meshing with the sun gears, a drive input to the planet carrier, and a brake acting on one of the sun gears.

5. Handling apparatus according to claim 4, comprising straight chain guides extending parallel to the straight path and assisting to prevent deflection of the chains from the path.

6. Handling apparatus according to claim 4, the chains having rollers on the pivot pins and within the channels of the links to be engaged by the sprockets, and having further rollers externally of the links engaging the guides.

7. Handling apparatus comprising
   (a) a probe structure constituted by
      ($a_1$) a pair of chains, each chain having a series of links and pivot pins interconnecting the links end to end,
      ($a_2$) each link having
      ($a_3$) side flanges, and
      ($a_4$) a base web connecting the side flanges, said flanges and base web defining a channel open at one side,
      ($a_5$) pivot pin receiving holes at each end of the side flanges adjacent their free edges, and the base web having
      ($a_6$) end surfaces forming abutments facing longitudinally of the chain and offset to one side of the pivot pins, each end surface of each link being contained in a plane which is at right angles to a plane containing the pivotal axes of the link and which contains the adjacent pivotal axis, relative rotation of the links in the sense to move adjacent end surfaces of the base webs towards one another being limited by abutment of the end surfaces when the base webs of the links are aligned, whereby the chain can be bent from the straight only in a sense to separate said end surfaces, and
      ($a_7$) a pick-up device pivoted to said chains at adjacent ends thereof, and further comprising
   (b) feed means feeding said chains side by side into a straight path to carry said pick-up device in said path, said chains being fed in said path with the base webs of the links of one of the chains face to face with the base webs of the other chain and with the channels of the links of the chains oppositely facing.

8. Handling apparatus comprising
   (a) a probe structure constituted by
      ($a_1$) a pair of chains, each chain having a series of links and pivot pins interconnecting the links end to end,
      ($a_2$) each link having
      ($a_3$) side flanges, and
      ($a_4$) a base web connecting the side flanges, said flanges and base web defining a channel open at one side, ($a_5$) pivot pin receiving holes at each end of the side flanges adjacent their free edges, and the base web having ($a_6$) end surfaces forming abutments facing longitudinally of the chain and offset to one side of the pivot pins, each end surface of each link being contained in a plane which is at right angles to a plane containing the pivotal axes of the link and which contains the adjacent pivotal axis, relative rotation of the links in the sense to move adjacent end surfaces of the base webs towards one another being limited by abutment of the end surfaces when the base webs of the links are aligned, whereby the chain can be bent from the straight only in a sense to separate said end surfaces, and ($a_7$) a pick-up device pivoted to said chains at adjacent ends thereof, and further comprising (b) feed means feeding said chains side by side into a straight path to carry said pick-up device in said path, said chains being fed in said path with the base webs of the links of one of the chains face to face with the base webs of the other chain and with the channels of the links of the chains oppositely facing, and including.

(c) storage housing for the chains disposed one on each side of the path, and (d) drive means comprising ($d_1$) a pair of chain sprockets, one on each side of the path, ($d_2$) guides for the chains leading from the storage housings for the chains, the guides following the periphery of the sprockets to lead the chains into the straight path, and ($d_3$) gearing interconnecting the sprockets and including ($d_4$) a differential gear, the differential gear having ($d_5$) sun gears driving the sprockets respectively, ($d_6$) a planet carrier, ($d_7$) planet gears mounted in the planet carrier and meshing with the sun gears, ($d_8$) a drive input to the planet carrier, and ($d_9$) a brake acting on one of the sun gears.

9. Handling apparatus according to claim 8, comprising also straight chain guides arranged parallel to the straight path and adapted to assist in preventing deflection of the probe structure from the path.

10. Handling apparatus according to claim 9, the chains having channel section links, rollers within the links to be engaged by the sprockets and further rollers externally of the links to engage the guide means.

References Cited in the file of this patent
UNITED STATES PATENTS

| | | |
|---|---|---|
| 486,389 | Wright | Nov. 15, 1892 |
| 793,355 | De Brouwer | June 27, 1905 |
| 1,578,072 | Canning | Mar. 23, 1926 |
| 2,634,156 | Crimmel | Apr. 7, 1953 |
| 2,650,129 | Axelsen | Aug. 25, 1953 |